(12) United States Patent
Shimizu

(10) Patent No.: US 7,446,732 B2
(45) Date of Patent: Nov. 4, 2008

(54) DISPLAY CONTROL DEVICE

(75) Inventor: Hirotoshi Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 894 days.

(21) Appl. No.: 10/828,583

(22) Filed: Apr. 21, 2004

(65) Prior Publication Data

US 2004/0196212 A1   Oct. 7, 2004

Related U.S. Application Data

(63) Continuation of application No. PCT/JP01/09395, filed on Oct. 25, 2001.

(51) Int. Cl.
G09G 5/00 (2006.01)

(52) U.S. Cl. .................................... 345/3.1

(58) Field of Classification Search ......... 345/204–215, 345/1.1–3.4, 11, 30, 38, 87–111
See application file for complete search history.

(56) References Cited

U.S. PATENT DOCUMENTS

| | | | |
|---|---|---|---|
| 5,488,627 A | 1/1996 | Hardin et al. | 375/204 |
| 5,631,920 A | 5/1997 | Hardin | 375/200 |
| 5,758,135 A | 5/1998 | Tucker et al. | 395/556 |
| 5,867,524 A | 2/1999 | Booth et al. | 375/200 |
| 5,872,807 A | 2/1999 | Booth et al. | 375/200 |
| 6,046,735 A * | 4/2000 | Bassetti et al. | 345/204 |
| 6,580,432 B1 * | 6/2003 | Leung et al. | 345/558 |

FOREIGN PATENT DOCUMENTS

| | | |
|---|---|---|
| EP | 655 829 | 5/1995 |
| EP | 739 089 | 10/1996 |
| EP | 831 452 | 3/1998 |
| EP | 1 073 194 | 1/2001 |
| JP | 4-122985 | 4/1992 |
| JP | 7-235862 | 9/1995 |
| JP | 9-98152 | 4/1997 |
| JP | 10-116061 | 5/1998 |
| JP | 11-249622 | 9/1999 |
| JP | 2000-125149 | 4/2000 |
| JP | 2001-14056 | 1/2001 |
| JP | 2001-67054 | 3/2001 |
| JP | 2001-94734 | 4/2001 |

* cited by examiner

*Primary Examiner*—Sumati Lefkowitz
*Assistant Examiner*—Srilakshmi K Kumar
(74) *Attorney, Agent, or Firm*—Greer, Burns & Crain, Ltd.

(57) ABSTRACT

A display control device comprises: a cathode ray tube (CRT) control unit for transferring, to a CRT display, a CRT transfer clock signal, a video data signal and a synchronous signal in accordance with the CRT transfer clock signal generated from a first clock signal having a constant and stable cycle; and a liquid crystal display (LCD) control unit for transferring, to a LCD display, a LCD transfer clock signal, a video data signal and a synchronous signal in accordance with the LCD transfer clock signal generated from a second clock signal as a spread spectrum clocking signal generated based on the first clock signal.

7 Claims, 8 Drawing Sheets

BASIC CLOCK CLK1 & MODULATED CLOCK CLK2

DISPLAY CONTROL DEVICE

This is a continuation of International PCT Application No. PCT/JP01/09395 filed Oct. 25, 2001.

BACKGROUND OF THE INVENTION

1. Field of the Invention

The present invention relates to a display control device for transferring video data to a CRT (Cathode Ray Tube) display and a LCD (Liquid Crystal Display) display.

2. Description of the Related Art

In the field of general-purpose computers such as a personal computer (PC), an office computer, etc., there has hitherto been a notebook-type PC displaying pictures or images on a LCD display by use of a display control device (a LCD controller) being built-in a LCD interface and a personal computer/office computer that is digitally connected to the LCD display.

As a recent tendency, there have increased cases of supplying a market with, as main commercial articles, the notebook type PC using the LCD display and the desktop type PC that is adopted the LCD as standard equipment. Further, by reduction of prices of the PCs, a domestic-utility-rate (percentage) of the PCs rises year after year.

The standard of VCCI (Voluntary Control Council for Interference by Information Technology Equipment) applied to the PCs utilized in home, is required a strict standard "CLASS-B". In "CLASS-B", a countermeasure against EMI (Electromagnetic Interference) noises due to electromagnetic radiation from the PC is an indispensable item.

FIGS. 7 and 8 are diagrams showing an example of a LCD controller mounted on the PC. The PC using the LCD (which implements a display interface connector for the LCD) as a display device, generally further implements a display interface connector for a CRT display, whereby a picture or an image can be, in the case of both of the LCD and the CRT being connected to the PC, displayed simultaneously on the LCD and the CRT.

Therefore, the LCD controller includes a data converting unit 51 and a FIFO (first-in first-out) buffer 52 as a system (a LCD control unit) related to the display control of the LCD, and a FIFO buffer 53 and a DAC (Digital to Analog Converter) 54 as a system (a CRT control unit) related to the display control of the CRT. The LCD control unit and the CRT control unit are connected to an external video memory (VRAM) for storing data of the picture displayed on the LCD and/or the CRT. Moreover, the LCD controller includes a timing generator 55.

The timing generator 55 receives a basic clock CLK from an external clock generation source (a clock generator), and generates a readout timing signal from the basic clock CLK. The video (picture or image) data are read from the VRAM in accordance with this readout timing signal and inputted to the LCD control unit and the CRT control unit, respectively. In the LCD control unit, the data converting unit 51 converts the video data from the VRAM into a format in which the video data should be transferred to the LCD, and the converted video data are transferred to the LCD via a LCD interface. In the CRT control unit, the DAC 54 effects a digital-to-analogue conversion of the video data from the VRAM, and the converted video data are transferred to the CRT via a CRT interface. These operations are conducted based on a transfer timing signal generated from the basic clock CLK by the clock generator 55.

In such a configuration, the LCD controller has a function of transferring and displaying the same display screen on the CRT and on the LCD as well. Further, the LCD controller has a function of simultaneously displaying the same display screen on the LCR and the CRT. These functions are indispensable functions possessed by the LCD controller as a product.

Incidentally, in designs of the recent PCs adopt a method, as the mainstream method, to reduce the EMI noises from a single mother board, a clock buffer having a spread spectrum function is used as a clock generator of the mother board and supplying spread spectrum clocking (SSC) signals to a CPU and peripheral circuits (a main memory, etc., excluding the LCD controller) thereof which are mounted on the mother board. The SSC signal is a clock signal in which a frequency bandwidth of an original clock signal is spread up to a broad frequency bandwidth that is several ten times as broad as the former frequency band. The SSC signal has a characteristic that a peak of its energy, though the bandwidth thereof expands, decreases, and hence it is hard to emit the EMI noises as compared with the original clock signal.

In the present situation, other clock generator different from the clock generator of the mother board is prepared for the LCD controller, and the LCD controller receives one clock signal (with non-spread spectrum), as the basic clock CLK, in which a cycle of being supplied from the other clock generator is fixed and stable. Accordingly, the LCD controller transfers the basic clock CLK with non-spread spectrum together with the video data to the LCD. This is derived from the following reasons.

(1) If the basic clock signal is the SSC signal, a jitter held on the SSC signal brings about a fluctuation of transfer timing, resulting in an occurrence of a problem of causing a distortion and a flicker on a display screen of the CRT that is analogously operated (which executes a time-division transfer and a display process).

(2) In the case of simultaneously displaying the same picture or image (video) on the LCD and the CRT, it is considered that the video data are read out at different clocks (readout timing) twice from the VRAM and supplied to the LCD control unit and the CRT control unit, respectively. A readout speed from the VRAM in the present situation does not yet reach an extent capable of responding to the readout control under which a frame cycle of the LCD does not conflict with a frame cycle of the CRT. Therefore, in the case of performing the simultaneous display, the frame frequencies of the LCD and of the CRT are made coincident, and the LCD/CRT control units are supplied with the video data read from the VRAM by one reading operation at the readout timing generated from the basic clock CLK.

A tendency over the recent years is that there have increased the number of displayable colors, a resolution and a frame frequency of the LCD, respectively. This is accompanied by a rise in data size of the data transferred to the LCD from the LCD controller and a rise in the frequency of the transfer clock signal transferred to the LCD. Derived from this, a cable for transferring video data signals (R/G/B data signals), synchronous signals (horizontal/vertical synchronous signals) and a transfer clock signal (transfer timing signal) to the LCD from the PC, becomes one of portions where the EMI noises are emitted. In particular, the transfer clock signal becomes a large factor for causing the EMI noises.

The cable is extended between, if the PC is of a notebook type, a box body on the side of the PC main body and a box body of the LCD, these box bodies being connected by hinges (see FIG. 8), and, if the PC is of a desktop type, the PC is in a state of being non-covered with the box body. Thus, the cable is in a position irresistible against electromagnetic radiation, and therefore a PC designer has a large problem of how the radiation of the EMI noises from the cable can be restrained.

SUMMARY OF THE INVENTION

It is an object of the present invention to provide a display control device capable of restraining the EMI radiation due to the clock signal transferred to the LCD without any decline of quality of the picture displayed on the CRT.

The present invention is a display control device (graphics controller) comprising a CRT control unit for transferring, to a CRT display, a CRT transfer clock signal, a video data signal and a synchronous signal in accordance with the CRT transfer clock signal generated from a first clock signal of which a cycle is constant (fixed) and stable, and a LCD control unit for transferring, to a LCD display, a LCD transfer clock signal, a video data signal and a synchronous signal in accordance with the LCD transfer clock signal generated from a second clock signal as a spread spectrum clocking signal generated based on the first clock signal (e.g., the second clock signal into which the first clock signal is spectrum-spread).

According to the present invention, the transfer clock generated from the first clock of which the cycle is fixed and stable, is transferred to the CRT, and the CRT displays a picture based on this transfer clock, whereby an image quality on the CRT can be maintained. On the other hand, the transfer clock generated from the second clock into which the first clock has been spectrum-spread, is transferred to the LCD. This transfer clock, in which electromagnetic radiation intensity is restrained by the spread spectrum, is therefore capable of retraining an emission of EMI noises when the transfer clock is transferred to the LCD.

In the display control device according to the present invention, it is preferable the CRT control unit and the LCD control unit respectively receive video data for a transfer object which are stored on a video memory in accordance with a readout timing generated from the second clock.

In the display control device according to the present invention, it is further preferable that the CRT control unit and the LCD control unit transfer the video data at such timing that the same picture is displayed substantially simultaneously on the CRT display and on the LCD display.

In the display control device according to the present invention, it is till further preferable that the readout timing is generated synchronizing with a display cycle of the LCD display, the LCD control unit receives the video data for the transfer object that are stored on the video memory each time the readout timing is generated, and the CRT control unit receives the video data for the transfer object which are stored on the video memory only in a case where the readout timing further synchronizing with a display cycle of the CRT display, is generated.

The display control device according to the present invention may further comprise a monitoring unit monitoring a transfer quantity of the video data per unit time and outputting a signal for controlling a width of the spread spectrum of the second clock in accordance with the transfer quantity of the video data.

The display control device according to the present invention may be structured, into one chip, together with the video memory for storing the video data for the transfer object.

The display control device according to the present invention may further comprise a digital visual interface, wherein in the case of displaying the picture on the CRT display, the video data from the CRT control unit may be transferred to the CRT display via the digital visual interface, and, in the case of displaying the picture on the liquid crystal display, the video data from the LCD control unit, the horizontal/vertical synchronous signals and the second clock may be transferred to the liquid crystal display via the digital visual interface.

The display control device according to the present invention may be structured, into one chip, together with a chip connecting a CPU, a main memory and an extension bus to each other, and serving as a bridge for the data therebetween.

FIG. A is an explanatory diagram showing the prior art.

Figure 8A:
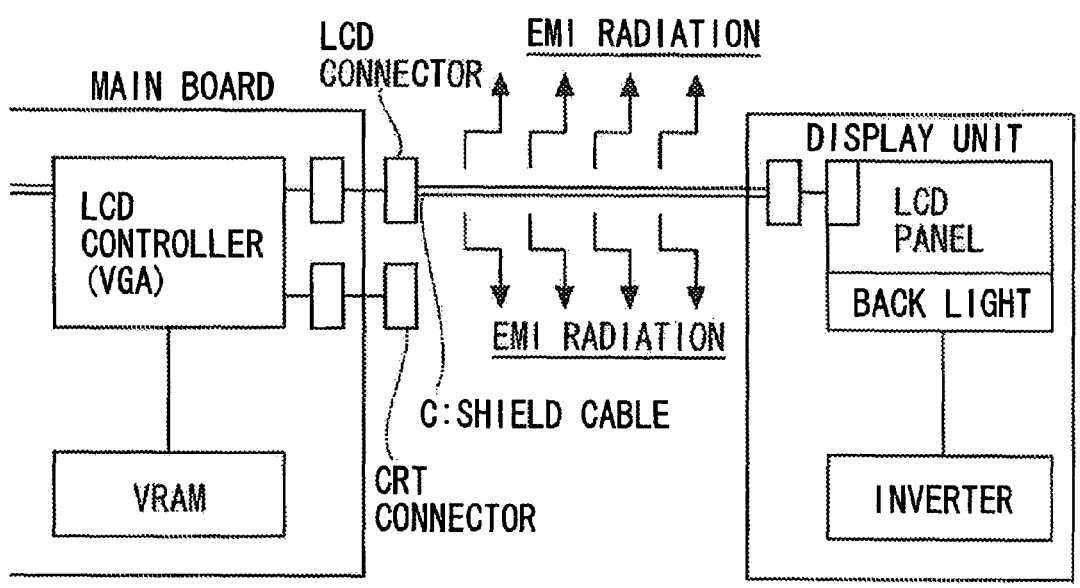
Figure 8B:
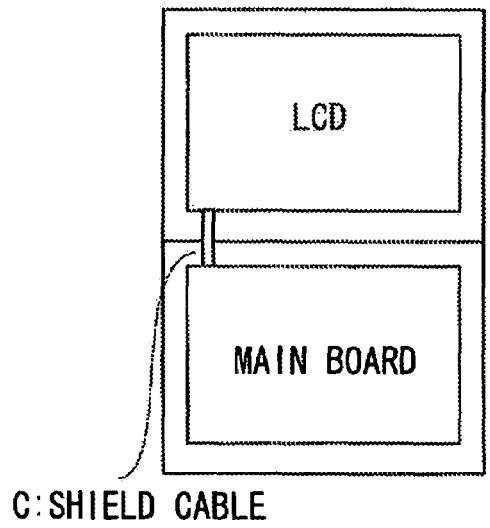

FIG. 8B is an explanatory diagram showing the prior art.

Figure 8C:
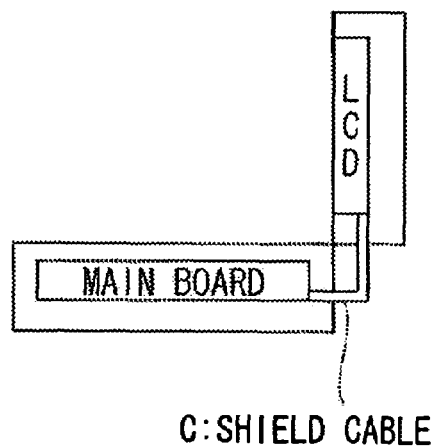

FIG. 8C is an explanatory diagram showing the prior art.

DESCRIPTION OF THE PREFERRED EMBODIMENTS

A best mode for carrying out the present invention will hereinafter be described. The following embodiments are exemplifications, and the present invention is not limited to the architecture in the embodiments.

First Embodiment

Figure 1:
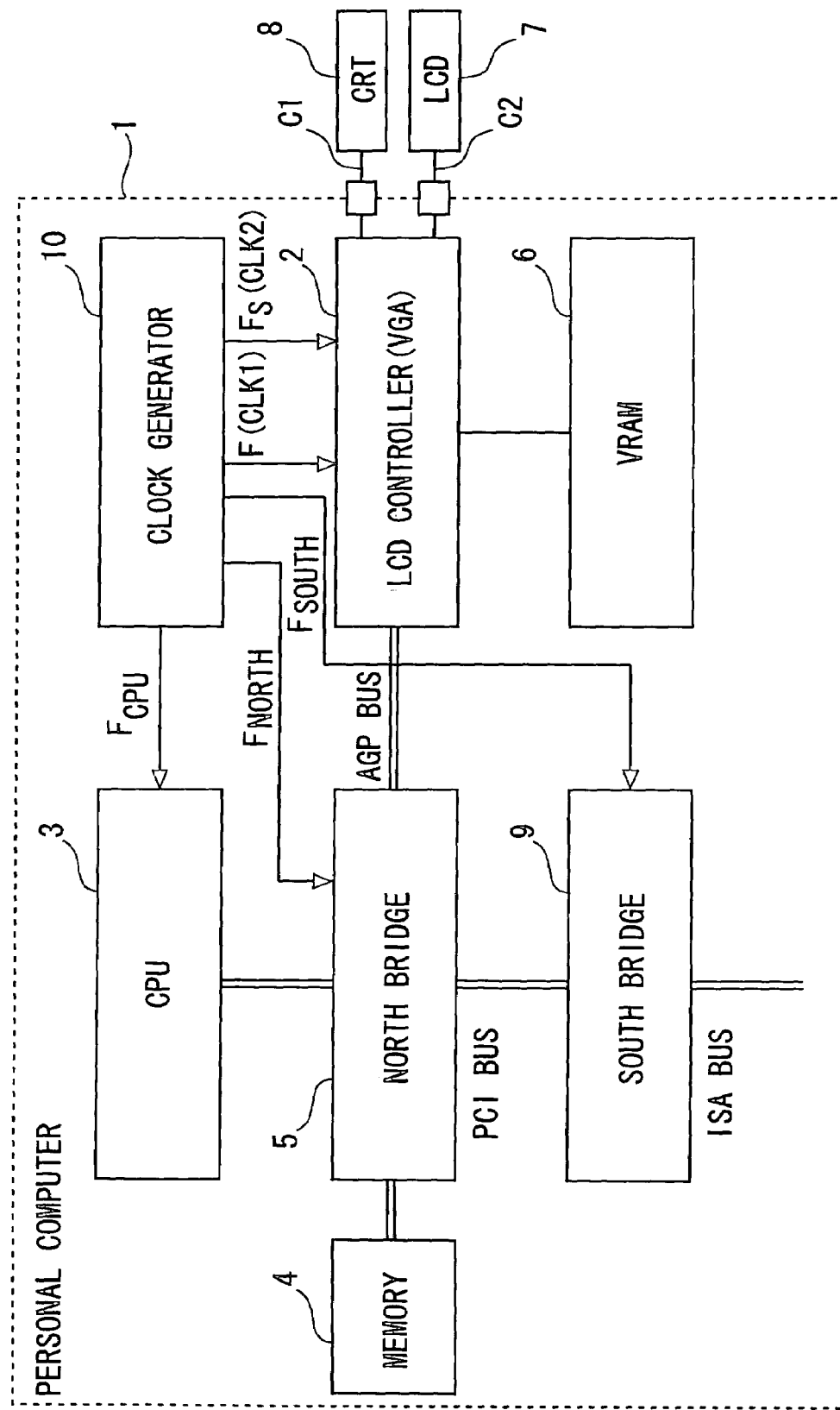
FIG. 1 is a block diagram showing an example of architecture of a personal computer to which a display control device of the present invention is applied.

FIG. 1 is a diagram showing an outline of architecture of a personal computer (PC) 1 into which a display control device according to an embodiment of the present invention is installed. FIG. 1 illustrates architecture of a PC-AT compatible PC (AT compatible PC) by way an example, wherein a LCD controller 2 is illustrated as a display control device. The LCD controller can be exemplified by, for instance, VGA (Video Graphics Array).

The LCD controller 2 is connected via an AGP (Accelerated Graphics Port) bus to a north bridge 5 as a bridge circuit for controlling a CPU 3 and a memory (main memory) 4. Further, the LCD controller 2 is connected also to a video memory (VRAM (Video Random Access Memory)) 6 for storing data for displaying, and is connectable via cables C1 and C2 to a LCD display 7 and a CRT display 8 that display the display data stored on the VRAM 6.

The north bridge 5 is connected to a south bridge 9 via a PCI (Peripheral Component Interface) bus, and the south bridge 9 controls a hard disk and an input/output (I/O) device such as a keyboard/mouse, etc., which are connected to the south bridge 9 via a PCI bus and an ISA (Industrial Standard Architecture) bus.

The PCI includes a clock generator 10 for supplying operation clocks respectively to the LCD controller 2 as a graphics controller, the CPU 3, the north bridge 5 and the south bridge 9. The clock generator 10 supplies the LCD controller 2 with a clock F (CLK1) and a clock $F_S$ (CLK2). Further, the clock generator 10 supplies the CPU 3 with a clock $F_{cpu}$, the north bridge 5 with a clock $F_{NORTH}$ and the south bridge 9 with a clock $F_{SOUTH}$.

Figure 2:
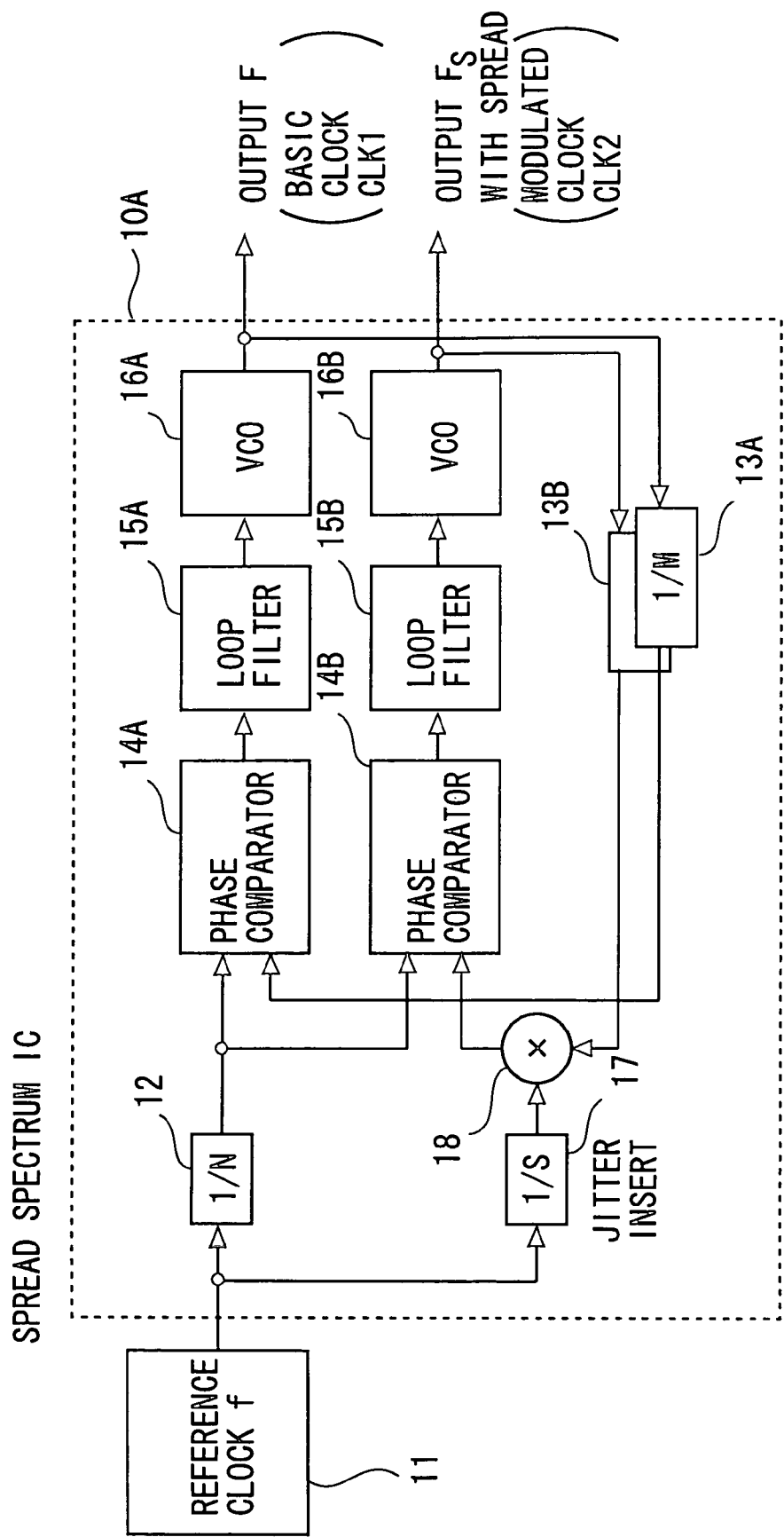
FIG. 2 is a block diagram showing a part of a clock generator shown in FIG. 1.

FIG. 2 is a block diagram showing an embodiment of the clock generator 10 illustrated in FIG. 1, and illustrates a configuration (a spread spectrum IC (integrated circuit) 10A in the clock generator 10) for outputting a basic clock CLK1 (a frequency output F) and a modulation clock CLK2 (a frequency output $F_S$) supplied to the LCD controller 2.

In FIG. 2, the spread spectrum IC 10A has a PLL (Phased Locked Loop) frequency synthesizer for obtaining the respective clocks CLK1 and CLK2.

The PLL frequency synthesizer for obtaining the basic clock CLK1 includes a frequency divider (programmable counter) 12 for generating a reference frequency "fn" into which an output (reference clock "f") given from a clock generation source (quarts oscillator) 11 is divided by N (1/N, where N is an integer), a frequency divider (programmable counter) 13A for dividing an input by M (1/M, where M is an integer), a phase comparator (phase detector) 14A, a loop filter 15A for extracting a DC (Direct Current) voltage from an output of the phase comparator 14A, and a VCO (Voltage Controlled Oscillator) 16A.

An output (oscillation frequency) "F" of the VCO 16A is inputted to the frequency divider 13A, wherein the frequency is divided by M (1/M). An output "fm" of the frequency divider 13A is inputted to the phase comparator 14A. The phase comparator 14A compares the reference frequency "fn" given from the frequency divider 12 with the output "fm" given from the frequency divider 13A, and applies the DC voltage for controlling the VCO 16A to a control terminal of the VCO 16A through the loop filter 15A. An output "F" matched in phase with the output "fn" of the frequency divider 12 is thereby outputted from the VCO 16A. The output "F" has a frequency given by F=f*M/N (multiply "f" by "M/N"). Thus, the frequency of the arbitrary integral multiple of the reference frequency "fn" can be obtained, and a degree of freedom of the output F can be enhanced by changing a value of N. This type of output "F" is supplied as the basic clock signal CLK1 to the LCD controller 2.

On the other hand, the PLL frequency synthesizer for obtaining the output "$F_S$" similarly includes a frequency divider 13B, a phase comparator 14B, a loop filter 15B and a VCO 16B. Further, a spread spectrum IC has a jitter generation unit 17 and a multiplier 18. The jitter generation unit 17 generates a jitter (which may also be called a "code") into which the reference clock "f" is divided by S (1/S). The multiplier 18 multiplies a jitter "f/S" outputted from the jitter generation unit 17 by the output fm given from the frequency divider 13B. A signal expanded by a frequency width of the jitter multiplied by the output "fm", can be thereby generated, and this signal is inputted to the phase comparator 14B. The frequency output "$F_S$" given by $F_S$=f*M/N (multiply "f" by "M/N", where a jitter "f/S" is added) matched in phase with the reference frequency "fn", is thereby outputted from the VCO 16B. Namely, the frequency output $F_S$ into which the output "F" is spread-spectrum-modulated by the jitter "f/S", is outputted from the VCO 16B. This frequency output "$F_S$" is supplied as a modulated clock signal CLK2 to the LCD controller 2.

Figure 3A:
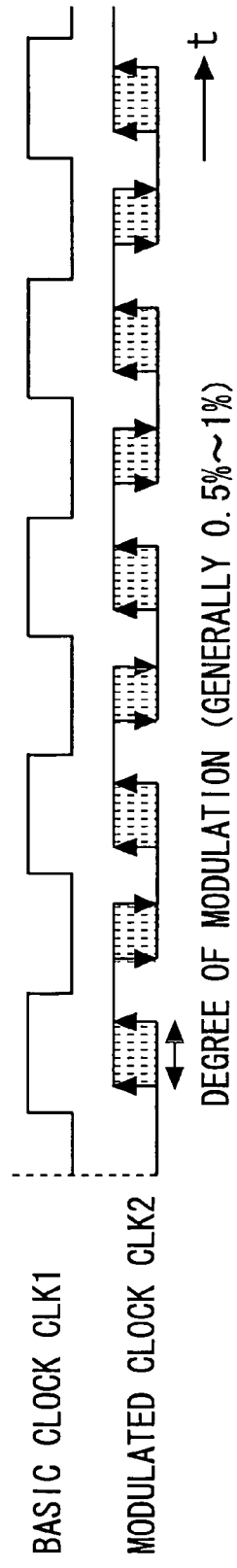
FIG. 3A is a diagram showing a basic clock and a modulated clock supplied to a LCD controller.

FIG. 3A is an explanatory diagram of the basic clock CLK1 and the modulated clock CLK2. As shown in FIG. 3A, the modulated clock CLK2 is modulated by a frequency equal to or lower than the frequency of the basic clock CLK1, the modulated clock CLK2 gets neither ahead of the basic clock CLK1 nor behind the basic clock CLK1. What is used as a degree (intensity) of the modulation of the output F (a diffusion rate: a rate of S to the output F) is, for example, 0.5% through 4.0%, however, particularly, a percentage of 0.5 through 1.0% is often utilized. The basic clock CLK1 corresponds to a first clock signal, and the modulated clock CLK2 corresponds to a second clock signal.

Figure 3B:
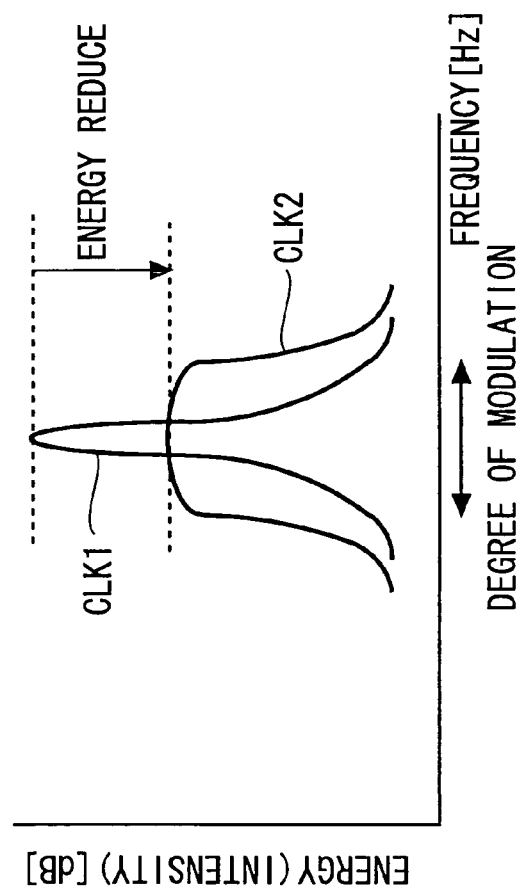
FIG. 3B is a diagram showing spectrums of the basic clock and the modulated clock.

FIG. 3B is a diagram showing spectrums of the basic clock CLK1 and the modulated clock CLK2. The modulated clock CLK2 becomes wider in its bandwidth than the basic clock CLK1 due to the spread spectrum modulation, however, a peak of energy (electromagnetic radiation intensity) thereof decreases to this extent. Accordingly, the EMI noises become hard to generate.

Figure 4:
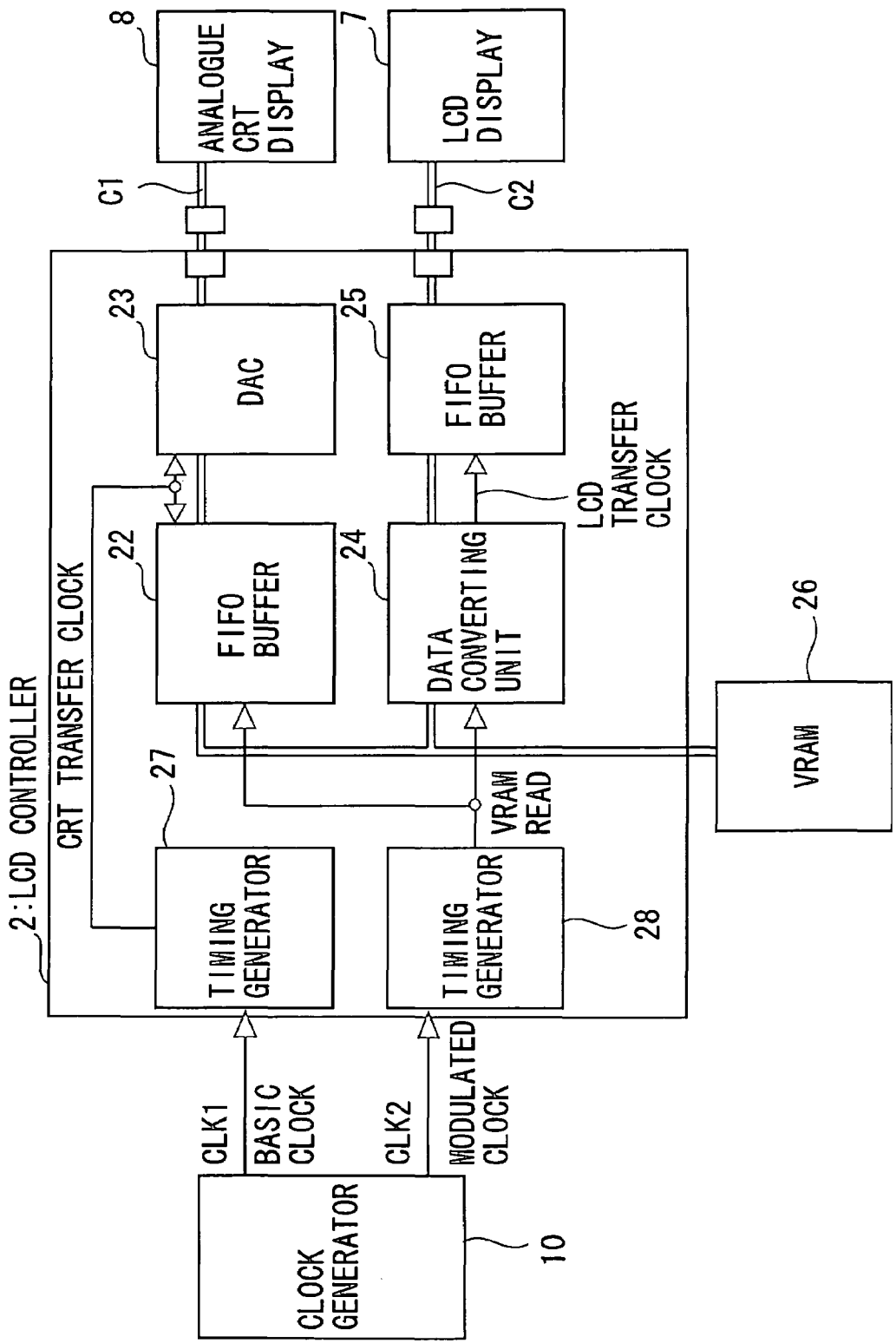
FIG. 4 is a block diagram showing the LCD controller illustrated in FIG. 1.

FIG. 4 is a block diagram showing an embodiment of the LCD controller illustrated in FIG. 1. In FIG. 4, the LCD controller 2, which is constructed of one chip, includes a FIFO (first-in first-out) buffer 22 and a DAC (Digital to Analogue Converter) 23 as a CRT control unit, and further includes a data converting unit 24 and a FIFO buffer 25 as a LCD control unit. Moreover, the FIFO buffer 22 and the data converting unit 24 are connected to an external video memory (VRAM) 26 via a bus. Further, the LCD controller is provided with two pieces of timing generators 27 and 28.

The timing generator 27 receives the basic clock CLK1 (output F) from the clock generator 10. On the other hand, the timing generator 28 receives the modulated clock CLK2 from the clock generator 10. Therefore, the LCD controller 2 has pins (input terminals) for inputting the respective clocks CLK1 and CLK2 or these two or more clocks.

The timing generator 27 generates, from the basic clock CLK1, a transfer timing signal (CRT transfer clock) for transferring the video data to the CRT display 8, and supplies the transfer timing signal to the CRT control unit.

The timing generator 28 generates, from the modulated clock CLK2, a readout timing signal (an access clock to the VRAM 26) of the video data from the VRAM 26, and supplies the readout timing signal to both of the LCD and CRT control units. Further, the timing generator 28 generates, from the modulated clock CLK2, a transfer timing signal (a LCD transfer clock) for transferring the video data to the LCD display 7, and supplies the transfer timing signal to the LCD control unit.

The VRAM 26 is stored with video data (e.g., R/G/B data of respective pixels corresponding to a resolution of a picture) for one frame which are to be written by the CPU 3 through the north bridge 5. When the readout timing signal is supplied to the FIFO buffer 22 and the data converting unit 24 from the timing generator 28, the video data are read from the VRAM 26 in accordance with the readout timing signal, and inputted to the FIFO buffer 22 and the data converting unit 24, respectively. Namely, the video data read out by one readout operation based on the readout timing signal are supplied to the CRT control unit and the LCD control unit, respectively.

Herein, the reason why the readout timing signal is generated by use of the modulated clock CLK2 is that it is possible to restrain, the modulated clock CLK2 is the SSC signal, a peak of the energy (the electromagnetic radiation intensity) of the readout timing signal based thereon and to restrain the radiation of the EMI noises from the LCD controller 2. As a matter of course, the readout timing signal generated from the basic clock CLK1 can be also used for the readout from the VRAM 26.

The video data read from the VRAM 26 are temporarily buffered on the FIFO buffer 22 in the CRT control unit. Thereafter, when the CRT transfer timing signal (CRT transfer clock) is inputted to the FIFO buffer 22 and the DAC 23 from the timing generator 27, the FIFO buffer 22 inputs the video data to the DAC 23 in accordance with the CRT transfer clock, and the DAC 23 effects a digital-to-analogue conversion of the video data in accordance with the CRT transfer clock and outputs the converted video data. The video data signals outputted from the DAC 23 are outputted together with horizontal and vertical synchronous signals thereof and the CRT transfer clock signals from the LCD controller 2, and transferred to the CRT display 8 via a CRT interface of the PC 1 and a cable C1. Then, pictures or images based on the video data are displayed on the CRT display 8. At this time, in the CRT display 8, the display control (horizontal/vertical scans, etc.) is conducted based on the transfer clock generated from the basic clock CLK1 of which a cycle is fixed and stable, and hence an image quality does not decline as compared with those of the conventional images.

On the other hand, in the LCD control unit, the video data read from the VRAM 26 are converted into a format (e.g., the data are subjected to a parallel-serial conversion) for transferring to the LCD by the data converting unit 24 and temporarily buffered on the FIFO buffer 25. Thereafter, when the LCD transfer timing signal is inputted to the FIFO buffer 25 from the timing generator 28, the video data buffered on the FIFO buffer 25 are read out. The video data signals outputted from the FIFO buffer 25 are outputted together with the horizontal/vertical synchronous signals thereof and the LCD transfer clock signals from the LCD controller 2, and transferred to the LCD display 7 via the CRT interface of the PC 1 and a cable C2.

The LCD transfer clock signal transferred to the LCD display 7 is generated from the modulated clock CLK2 as the SSC signal, and hence its energy (the electromagnetic radiation intensity) is reduced. Accordingly, the emission (radiation) of the EMI noises from the cable C2 is restrained. Note that a frequency of the LCD transfer clock becomes as high as, e.g., 20 MHz in terms of transferring a large quantity of digital signals. By contrast, a frequency of the CRT transfer clock is on the order of, e.g., 100 kHz because of the transfer of the analog signal and so on. Thus, the frequency of the CRT transfer clock transferred via the cable C1 is by far smaller than that of the LCD transfer clock, and hence there is almost no emission of the EMI noises.

Thus, the video data signals are outputted respectively from the CRT and LCD control units at the transfer timing (the LCD/CRT transfer clocks) different from the readout timing (the access clock) from the VRAM 26. The respective FIFO buffers 22 and 25 are provided for absorbing a phase difference (for switching the clock) between the access clock and each transfer clock. Further, the respective FIFO buffers 22 and 25 are provided for absorbing a transfer timing deviation and a display timing deviation between the CRT control unit and the LCD control unit (a deviation between the CRT transfer clock and the LCD transfer clock). The same picture or image can be thereby simultaneously displayed on the LCD display 7 and the CRT display 8.

Further, the LCD controller 2 is constructed to receive the input of the basic clock CLK1 and the modulated clock CLK2 from the outside thereof and constructed not to generate the modulated clock in an interior of the LCD controller 2 itself, and its configuration is easy to attain, wherein the spread spectrum system and the diffusion intensity thereof can be properly set.

Second Embodiment

The LCD controller 2 shown in FIG. 4 executes the readout control of the video data from the VRAM 26 simultaneously in the CRT control unit and the LCD control unit. Therefore, in the case of simultaneously displaying the same picture (screen) on the LCD display 7 and the CRT display 8, a frame frequency of the LCD display 7 must be in principle the same as a frame frequency of the CRT display 8.

On the other hand, unless the frame frequency of the LCD display 7 is set equal to or slightly higher than a back light frequency (normally 60 Hz) (which is set equal to or higher than 70 Hz on the basis of 60 Hz), interference fringes due to the back light appear on the screen, with the result that a flicker on the screen is visible to the naked eye. Moreover, the LCD display 7 has a tendency that a time of after-image per frame decreases. Hence, if the frame frequency is the same as that of the CRT display 8, there is a possibility in which the flicker might appear on the screen.

Figure 5:
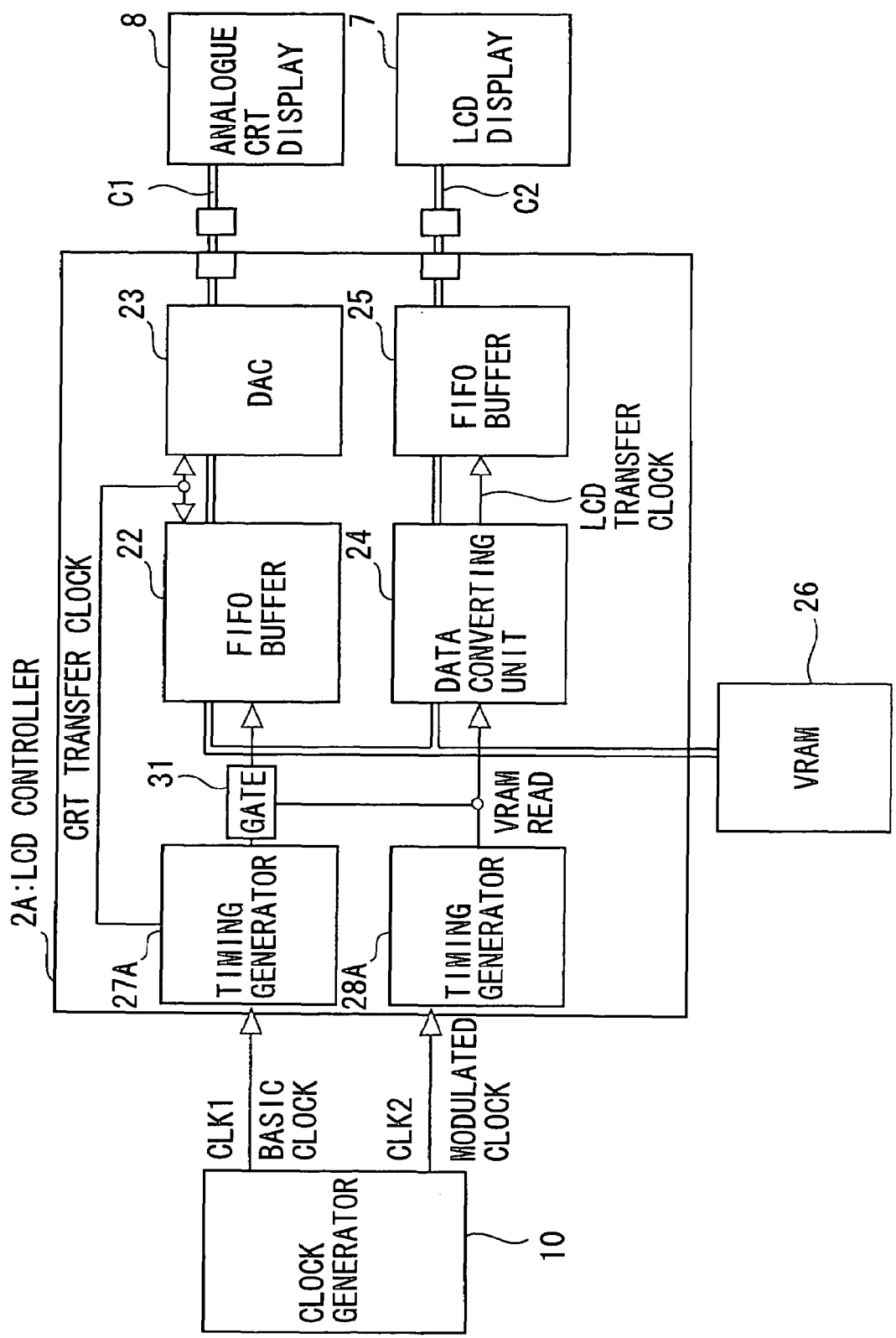
FIG. 5 is a block diagram showing another embodiment of the display control device of the present invention.

FIG. 5 is a block diagram showing a LCD controller 2A by way of a second embodiment of the present invention. In FIG. 5, the LCD controller 2A has a gate 31 interposed in a signal line for the readout timing signal to the FIFO buffer 22 from a timing generator 27A. The gate 31 switches ON/OFF an input of the readout timing signal to the FIFO buffer 22 on the basis of a control signal coming from a timing generator 27A. Output control of the control signal by the timing generator 27A is performed based on the setting by the CPU 3 (see FIG. 1).

In an example shown in FIG. 5, a frame frequency of the LCD display 7 is an n-multiple (where "n" is an integer equal to or larger than 2) of a frame frequency of the CRT display 8. For example, the frame frequency of the LCD display 7 is 120 Hz that is twice as large as the frame frequency, i.e., 60 Hz of the CRT display 8.

The timing generator 28A outputs a readout timing signal synchronizing with a frame cycle (a display cycle for one frame) of the LCD display 7. The LCD control unit (the data converting unit 24) receives the readout timing signal each time the readout timing signal is outputted from the timing generator 28A, and reads the video data from the VRAM 26.

The timing generator 27A switches on the gate 31, synchronizing with the frame cycle (display cycle) of the CRT display 8, and controls the gate 31 so that the readout timing signal from the timing generator 28A is inputted to the FIFO buffer 22. The readout timing is thereby given from the timing generator 28A to the CRT control unit once per n-times in accordance with the display cycle of the CRT display 8.

Accordingly, the CRT control unit (the FIFO buffer 22) receives the readout timing signal in accordance with the display cycle of the CRT display 8. Namely, it follows that the CRT control unit receives the video data from the VRAM 26 according to the frame frequency (60 Hz) of the CRT display 8, and transfers the video data.

Except for what has been described so far, the second embodiment is the same as the first embodiment. In the second embodiment, the frame frequency of the LCD display 7 is set to the multiple of the integer equal to or larger than 2, as large as the frame frequency of the CRT display 8, and the LCD control unit executes the process of transferring the video data twice or more times within the display cycle of the CRT display 8. This enables the interference caused by the back light of the LCD display 7 to be prevented. It is also feasible to prevent the flicker on the screen due to the short after-image time of the LCD display 7 and to enhance the image quality of the LCD display 7. On the other hand, the CRT DISPLAY 8 is capable of displaying the picture or image at such a frame frequency as to obtain the proper image quality.

Third Embodiment

Figure 6:
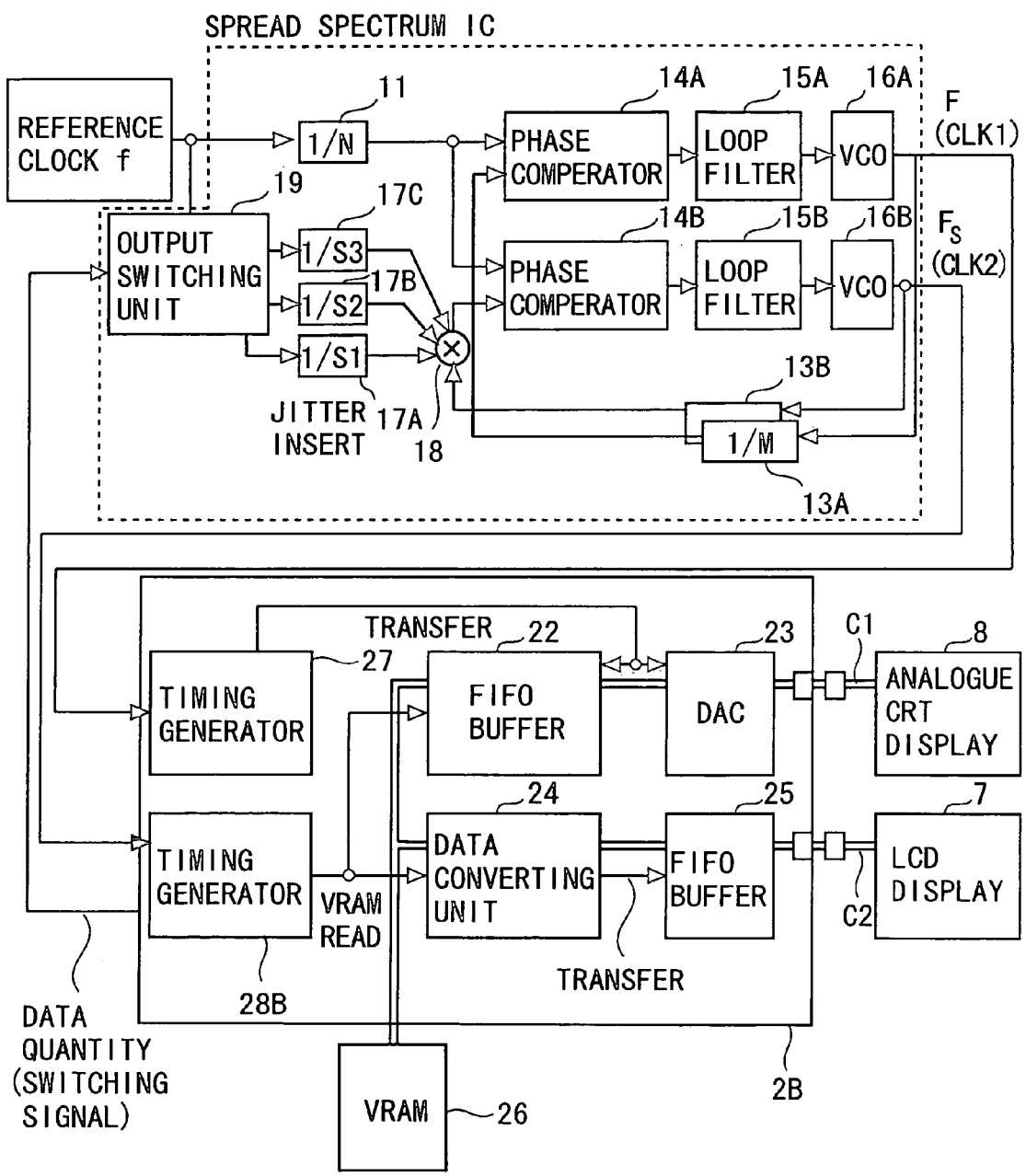
FIG. 6 is a block diagram showing still another embodiment of the display control device of the present invention.
Figure 7:
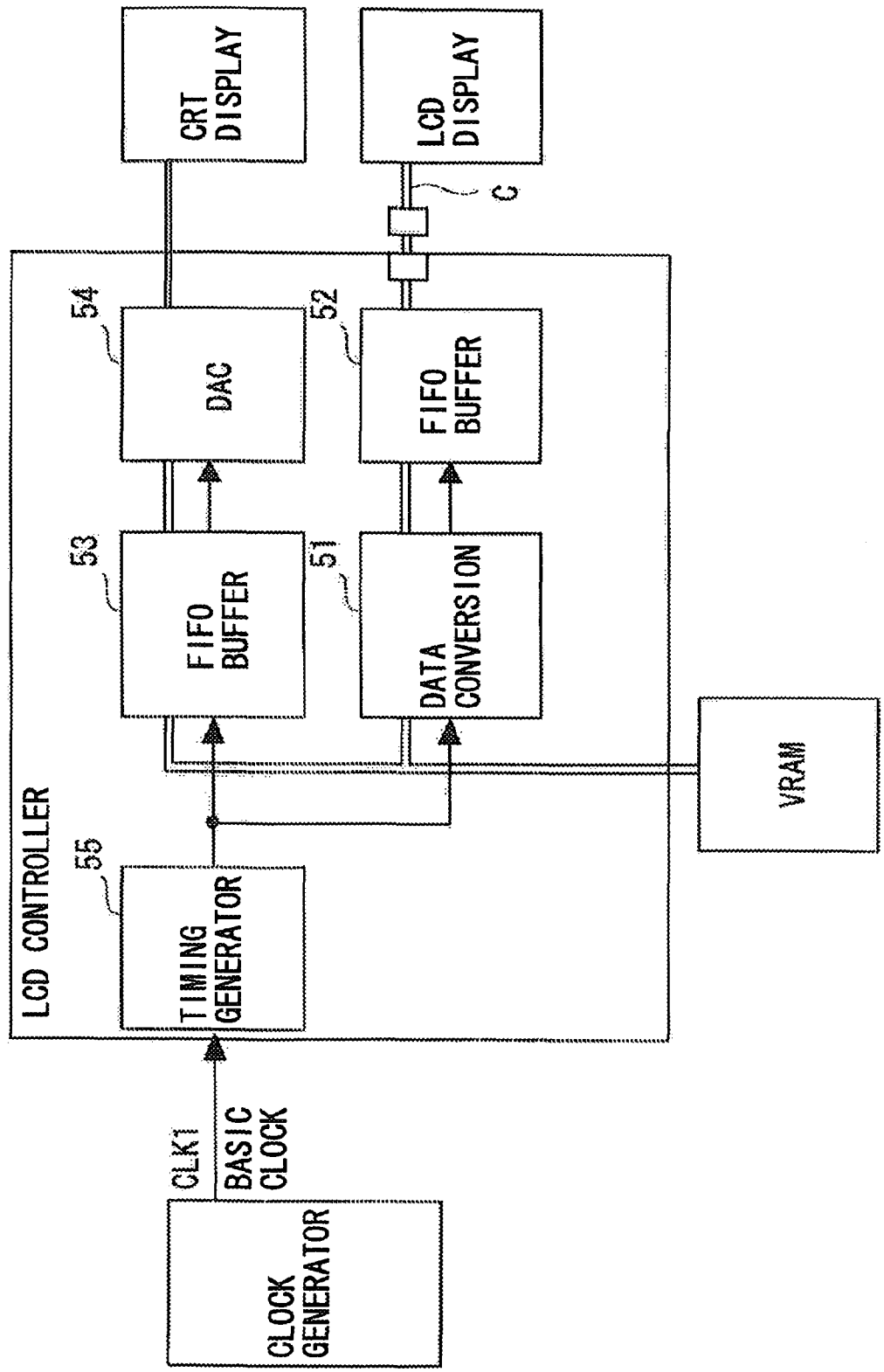
FIG. 7 is an explanatory diagram showing the prior art.

FIG. 6 is a block diagram showing a LCD controller 2B by way of a third embodiment of the present invention. In FIG. 6, the timing generator 28B functions as a monitoring means for monitoring a data quantity (data-transfer quantity) per unit time of transfer to the LCD display 7 in a way that monitors a resolution of the video data and the number of colors, which are written to the VRAM 26, and inputting a signal indicating the data quantity (a data quantity signal) to a spread spectrum IC 10B.

The data quantity of the monitoring object is divided (classified) into a plurality of levels (classes), wherein threshold values are provided between the respective levels. The timing generator 28B outputs, as a data quantity signal, a bit or bits indicating a level of the data quantity. For instance, in the case of dividing the data quantity into four levels, the data quantity signal is expressed in 2 bits. The timing generator 28B changes the bit value of the data quantity signal each time the data quantity of the monitoring object becomes higher or lower than the threshold value.

On the other hand, the spread spectrum IC 10B is provided with a plurality of jitter inserting units prepared corresponding to the levels of the data quantity. In an example shown in FIG. 6, the spread spectrum IC 10B is provided with jitter generation units 17A, 17B and 17C corresponding to the three levels (data quantity: level 1<level 2<level 3), and with an output switching unit 19.

The output switching unit 19 switches an output destination of the reference clock "f" in accordance with the data quantity signal from the timing generator 28B. Each of the jitter generation units 17A, 17B and 17C generates a jitter inserted in an output "fm" from a frequency divider 13B by dividing a frequency of the reference clock "f" by S (1/S), which is inputted from the output switching unit 19. Herein, a value of S is a value (diffusion width: diffusion intensity) for determining a degree (intensity) of the spread spectrum modulation, and the diffusion width expands as the value of S decreases. In the example shown in FIG. 6, the value of S is set such as S1 (level 1)>S2 (level 2)>S3 (level 3), wherein the diffusion width becomes larger as the data quantity increases.

Except for the configuration described above, the third embodiment is substantially the same as the first embodiment. According to the third embodiment, in a case where the data quantity for the transfer to the LCD display 7 is, for instance, the level 1, the timing generator 28B inputs, to the output switching unit 19, the data quantity signal (e.g., "00") for switching over the output destination of the reference clock "f" to the jitter generation unit 17A.

Thereafter, when the data quantity for the transfer to the LCD display 7 increases over a threshold value between the level 1 and the level 2, the timing generator 28B inputs, to the output switching unit 19, the data quantity signal (e.g., "01") for switching over the output destination of the reference clock "f" to the jitter generation unit 17B. Then, the output switching unit 19 switches over the output destination of the reference clock "f" to the jitter generation unit 17B. The frequency width of the jitter inserted in the output "fm" is thereby increased, and therefore the frequency width of the modulated clock CLK2 becomes much larger, while the electromagnetic radiation intensity becomes even lower.

Thereafter, when the data quantity rises to the level 3 from the level 2, the output destination of the reference clock "f" is switched over to the jitter generation unit 17C, with the result that the frequency width of the modulated clock CLK2 becomes much larger, while the electromagnetic radiation intensity becomes still lower. Thereafter, in a case where the data quantity decreases such as the level 3→the level 2→the level 1, operations opposite to those described above are performed.

According to the third embodiment, the width of the spread spectrum of the modulated clock CLK2 is controlled in accordance with the data quantity for the transfer to the LCD display 7, and hence, in the case of the increased data quantity, the electromagnetic radiation intensity of the LCD transfer clock can be decreased by expanding the width of the spread spectrum of the modulated clock CLK2. This makes it possible to restrain the radiation of the EMI noises from the cable C2, which is caused due to the rise in the frequency of the LCD transfer clock.

Note that the LCD controller 2 is connected via the AGP bus to the north bridge 5 in the example shown in FIG. 1 and may also be connected via the PCI bus to the north bridge 5. Further, the architecture shown in FIG. 1 has the 3-tiered bus structure, and the north bridge and the LCD controller 2 are separately prepared and may also be structured into one chip. For example, GMCH (Graphics and Memory Controller Hub) in the hub architecture by Intel Corp. may have the function of the graphics controller of the present invention.

Further, the LCD controller 2 and the VRAM 6 shown in FIG. 1 may be structured into one chip. Moreover, the function possessed by the graphics controller of the present invention can be applied to PCs having architecture other than the PC-AT compatible PC.

Still further, the PC 1 shown in FIG. 1 includes the CRT connector and the LCD connector, and the LCD controller 2 includes the CRT interface and the LCD interface connected thereto, respectively. In contrast, in a case where the PC 1 has a DVI (Digital Visual Interface) connector as a substitute for these CRT/LCD connectors, the LCD controller 2 may have the DVI, and the display outputs (the video data signal, the horizontal/vertical synchronous signals, the transfer clock) corresponding thereto may be transferred to the LCD display 7 or the CRT display 8 connected to the DVI connected through this DVI.

What is claimed is:

1. A display control device comprising:
   a cathode ray tube (CRT) control unit for transferring, to a CRT display, a CRT transfer clock signal, a video data signal and a synchronous signal in accordance with the CRT transfer clock signal generated from a first clock signal having a constant and stable cycle;
   a liquid crystal display (LCD) control unit for transferring, to a LCD display, a LCD transfer clock signal, a video data signal and a synchronous signal in accordance with the LCD transfer clock signal generated from a second clock signal as a spread spectrum clocking signal generated based on the first clock signal; and
   a monitoring unit monitoring a transfer quantity of the video data per unit time and outputting a signal for controlling a width of the spread spectrum of the second clock in accordance with the transfer quantity of the video data.

2. A display control device according to claim 1, wherein said CRT control unit and said LCD control unit respectively receive video data for a transfer object which are stored on a video memory in accordance with readout timing generated from the second clock.

3. A display control device according to claim 2, wherein said CRT control unit and said LCD control unit transfer the video data at such timing that the same picture is displayed substantially simultaneously on the CRT display and on the LCD display.

4. A display control device according to claim 3, wherein the readout timing is generated synchronizing with a display cycle of the LCD display, said LCD control unit receives the video data for the transfer object that are stored on the video memory each time the readout timing is generated, and said CRT control unit receives the video data for the transfer object which are stored on the video memory only in a case where the readout timing further synchronizing with a display cycle of the CRT display is generated.

5. A display control device according to claim 1, wherein said display control device is structured, into one chip, together with a chip connecting a central processing unit (CPU), a main memory and an extension bus to each other, and serving as a bridge for the data therebetween.

6. A display control device according to claim 1, wherein said display control device is structured, into one chip, together with said video memory for storing the video data for the transfer object.

7. A display control device according to claim 1, further comprising a digital visual interface, wherein in the case of displaying the picture on the CRT display, the video data from said CRT control unit are transferred to the CRT display via said digital visual interface, and in the case of displaying the picture on the liquid crystal display, the video data from said LCD control unit, the horizontal/vertical synchronous signals and the second clock are transferred to the liquid crystal display via said digital visual interface.

* * * * *